Dec. 6, 1938.  S. K. WALLACE  2,138,893
TRUCK ICE LOADING AND UNLOADING DEVICE
Filed June 14, 1937  2 Sheets-Sheet 1
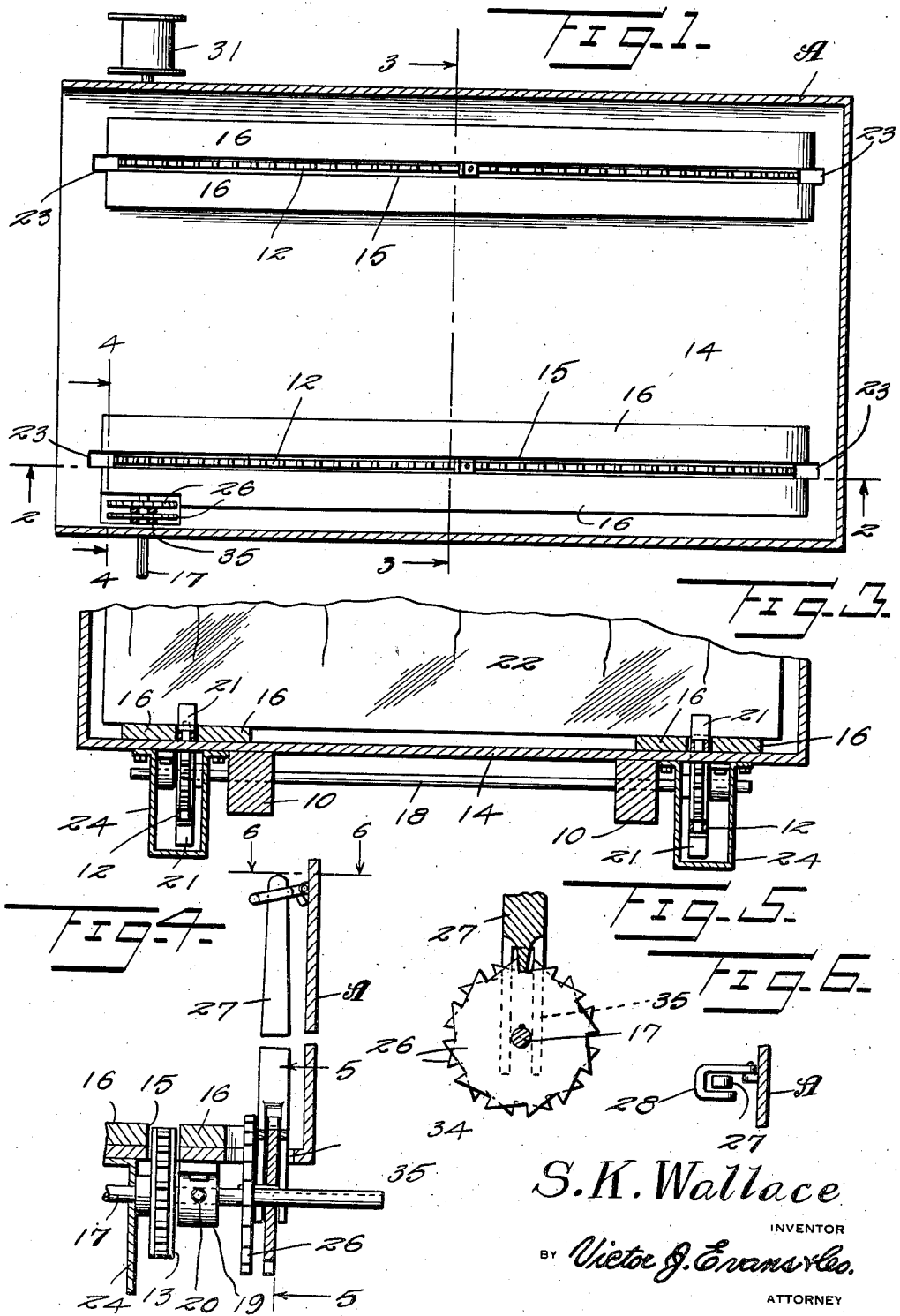
S. K. Wallace
INVENTOR
BY Victor J. Evans & Co.
ATTORNEY Dec. 6, 1938.   S. K. WALLACE   2,138,893
TRUCK ICE LOADING AND UNLOADING DEVICE
Filed June 14, 1937   2 Sheets-Sheet 2
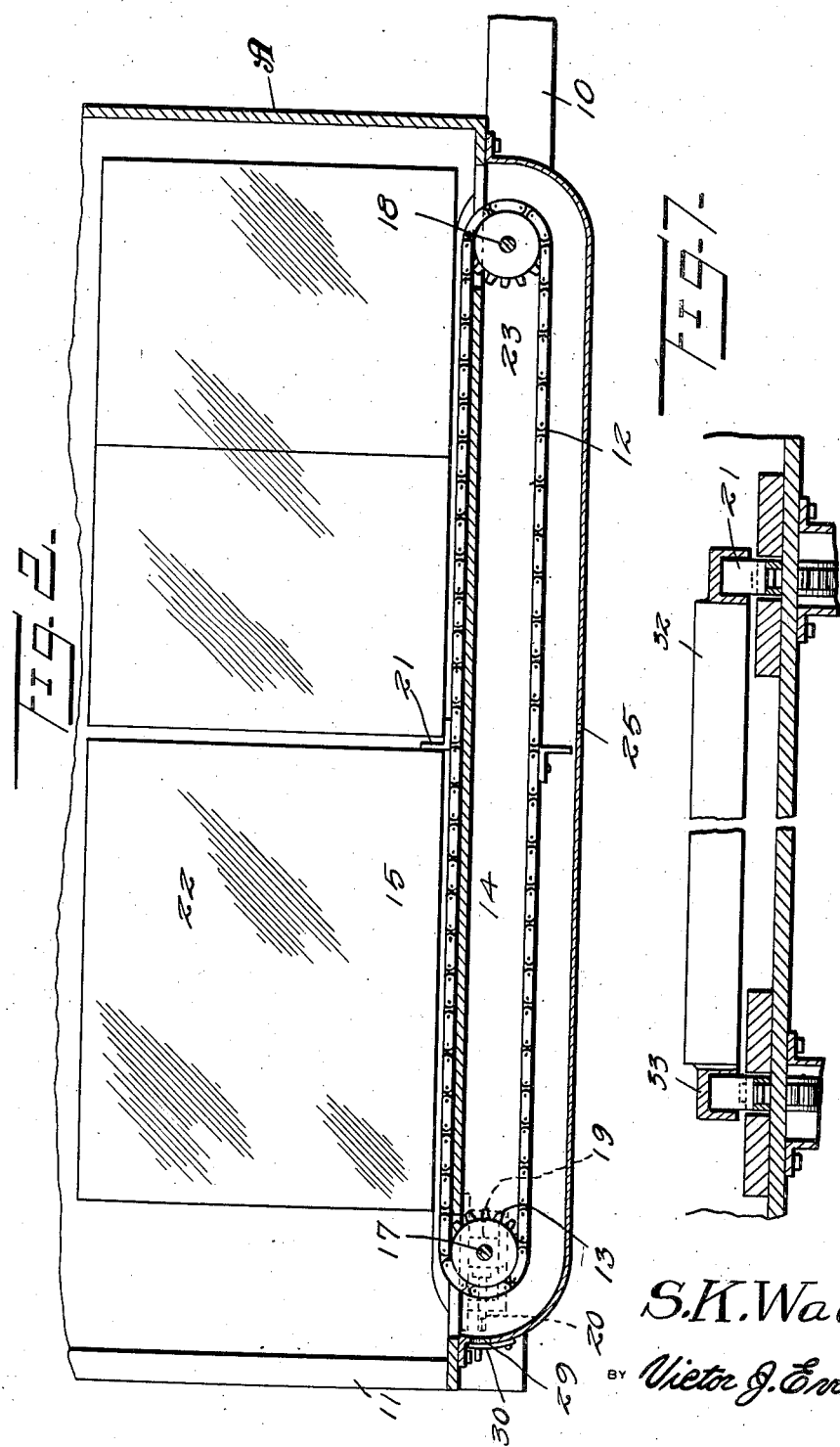
S. K. Wallace
INVENTOR
BY Victor J. Evans & Co.
ATTORNEY Patented Dec. 6, 1938

2,138,893

UNITED STATES PATENT OFFICE 2,138,893

TRUCK ICE LOADING AND UNLOADING DEVICE

Samuel K. Wallace, Memphis, Tenn.

Application June 14, 1937, Serial No. 148,193

2 Claims. (Cl. 214—83)

The invention relates to a loading and unloading mechanism and more especially to a truck ice loading and unloading device.

The primary object of the invention is the provision of a device of this character, wherein the same when arranged upon a truck will enable the handling of the ice blocks or pieces for the quick loading of the said truck or the unloading thereof, the device being of novel construction and under the manual control of the user of the truck.

Another object of the invention is the provision of a device of this character, wherein through the use of endless chains movably supported at the bed of a vehicle truck body and cleats upon said chains ice blocks or pieces can be pulled into the vehicle body or pulled therefrom thus enabling the convenient handling of the ice particularly when the truck is used for disposition of ice.

A further object of the invention is the provision of a device of this character, which is simple in its construction, thoroughly reliable and effective in operation, relieving a truckman from excessive labor in the handling of ice blocks both in the loading and unloading of a truck and inexpensive to manufacture and install.

With these and other objects in view, the invention consists in the features of construction, combination and arrangement of parts as will be hereinafter more fully described, illustrated in the accompanying drawings, which disclose the preferred and modified forms of embodiment of the invention and pointed out in the claims hereunto appended.

In the accompanying drawings:

Figure 1 is a horizontal sectional view taken through a vehicle truck body showing the device constructed in accordance with the invention applied thereto.

Figure 2 is a fragmentary sectional view taken on the line 2—2 of Figure 1 looking in the direction of the arrows.

Figure 3 is a fragmentary sectional view taken on the line 3—3 of Figure 1 looking in the direction of the arrows.

Figure 4 is a fragmentary sectional view on the line 4—4 of Figure 1 looking in the direction of the arrows.

Figure 5 is a fragmentary sectional view on the line 5—5 of Figure 4 looking in the direction of the arrows.

Figure 6 is a sectional view on the line 6—6 of Figure 4 looking in the direction of the arrows.

Figure 7 is a fragmentary vertical transverse sectional view showing a slight modification.

Similar reference characters indicate corresponding parts throughout the several views in the drawings.

Referring to the drawings in detail, A designates generally a portion of a vehicle truck body supported as usual upon the side sills 10 of the chassis and being open at its rear end as at 11 so that such body can be loaded and unloaded through this open end as is customary.

The device constituting the present invention comprises a pair of endless chains 12 of the link type, these being disposed with relation to the truck body A in spaced parallel order longitudinally of the said truck body and are trained over sprocket gears 13 so that the upper stretches of the said chains will lie uppermost to the bottom 14 of the body A and travel through runways 15 created by spaced strips 16 at opposite sides of the chains 12 and superimposed upon and fixed to the said bottom 14. These chains 12 are of a length to extend throughout a major portion of the longitudinal extent of the truck body A and the sprocket wheels 13 are fixed to driving and driven axles 17 and 18, respectively, journaled in bearings. The bearings 19 for the driving axle 17 being adjustable to function as chain tighteners as at 20.

Carried by the chains 12 are cleats 21 which are adapted to engage ice blocks 22 so that the same can be loaded into the body A or unloaded therefrom. These cleats 21 abut the blocks 22 when in the path thereof and the said chains 12 are in motion. The strips 16 constitute runners for the blocks of ice 22 when resting thereon. The bottom 14 next to the sprocket wheels 13 has formed therein slots 23 for the free passage of the chains therethrough so that an upper stretch of each will override the bottom 14 of the body A to have the cleats 21 engage with the blocks of ice 22 for loading and unloading purposes and in this manner eliminating manual handling of the ice.

Beneath the bottom 14 of the body A are casements 24 for enclosing the chains 12 at the lower stretches thereof and also the sprocket wheels 13, these casements, each being provided with a drain hole 25 for the clearing of water therein resultant from the melting of the ice within the body A.

Fixed to the driving axle 17 is a pair of reversely acting ratchet wheels 26, each of which is adapted to be engaged with a forked saddling lever 27 changeable from one wheel 26 to the other for reversely driving the axle 17. The driving of the axle 17 in one direction loads the body A and on the driving of such axle in the other direction unloads the body of the vehicle truck. This lever 27 when saddling one of the sprocket wheels 26 is releasably held in a hasp-like latch or keeper 28 fitted within the body A.

Each chain tightener 20 is accessible through an opening 29 normally closed by a cover piece 30, the opening being in each of the casements.

It is desirable to have the driving axle 17 of a length to extend laterally beyond opposite sides of the body A and one of these ends is constructed for the attachment of a hand crank (not shown) therewith while the other end may be fitted with a belt pulley 31 for accommodating a power belt (not shown).

In Figure 7 of the drawings there is shown a slight modification, wherein a releasable abutment slat 32 is in association with the cleats 21 on the chains 12 and this slat 32 extends crosswise between the chains for engaging small pieces of ice that may be resting upon the bottom 14 within the body A for the unloading thereof from the latter. This slat 32 at opposite ends has formed therewith the socketed terminals 33 accommodating the cleats 21 on the respective chains 12.

The lever 27 is manually manipulated for the driving of the axle 17 in the operation of the loading and unloading device, the manner of connection of the said lever with the ratchet wheels 26 being clearly shown in Figures 4 and 5 of the drawings and the bottom 14 of the body A has an opening 34 for the passage of the forked end 35 of this lever therethrough for straddling engagement with the ratchet wheels 26. Of course, these ratchet wheels 26 may be located outside of the body A and the lever 27 engageable therewith from without the said body.

What is claimed is:

1. A loading and unloading device for a truck having a bed provided with spaced parallel slots longitudinally thereof, comprising a pair of endless chains movably supported with relation to said bed and having the upper stretches thereof movable in said slots, strips on said bed at opposite sides of the slots and effecting runways for the upper stretches of said chains, cleats connected with said chains, sprocket wheels having the chains trained thereover, a power shaft operating certain of said sprocket wheels, reversely-acting ratchet wheels fixed to said shaft, a double-armed fork-like lever for saddling either of said ratchet wheels and having slots in its arms opening through the free ends thereof for straddling engagement of the said arms on the said shaft, and a latching projection within the fork of said lever for engaging the teeth of the ratchet wheels.

2. A loading and unloading device for a truck having a bed provided with spaced parallel slots longitudinally thereof, comprising a pair of endless chains movably supported with relation to said bed and having the upper stretches thereof movable in said slots, strips on said bed at opposite sides of the slots and effecting runways for the upper stretches of said chains, cleats connected with said chains, sprocket wheels having the chains trained thereover, a power shaft operating certain of said sprocket wheels, reversely-acting ratchet wheels fixed to said shaft, a double-armed fork-like lever for saddling either of said ratchet wheels and having slots in its arms opening through the free ends thereof for straddling engagement of the said arms on the said shaft, a latching projection within the fork of said lever for engaging the teeth of the ratchet wheels, and a hasp-like latch on said truck and accommodating the said lever when in straddling relation to one of the ratchet wheels.

SAMUEL K. WALLACE.